US009068829B2

(12) United States Patent
Becheret

(10) Patent No.: US 9,068,829 B2
(45) Date of Patent: Jun. 30, 2015

(54) ORIENTATION DEVICE INCLUDING MEANS FOR DETECTING THAT THE DEVICE IS LYING FLAT ON A SUPPORT

(75) Inventor: Yves Becheret, Boulogne-Billancourt (FR)

(73) Assignee: Sagem Defense Securite, Boulogne-Billancourt (FR)

( * ) Notice: Subject to any disclaimer, the term of this patent is extended or adjusted under 35 U.S.C. 154(b) by 120 days.

(21) Appl. No.: 14/114,708

(22) PCT Filed: Apr. 19, 2012

(86) PCT No.: PCT/EP2012/057208
§ 371 (c)(1),
(2), (4) Date: Oct. 29, 2013

(87) PCT Pub. No.: WO2012/146532
PCT Pub. Date: Nov. 1, 2012

(65) Prior Publication Data
US 2014/0082951 A1     Mar. 27, 2014

(30) Foreign Application Priority Data
Apr. 29, 2011   (FR) ...................................... 11 01331

(51) Int. Cl.
*G01C 17/00*     (2006.01)
*G01C 17/38*     (2006.01)
*G01C 19/38*     (2006.01)

(52) U.S. Cl.
CPC ................ *G01C 17/00* (2013.01); *G01C 17/38* (2013.01); *G01C 19/38* (2013.01)

(58) Field of Classification Search
CPC ........ G01C 17/00; G01C 17/38; G01C 19/00; G01C 19/025; G01C 19/38
USPC ................................................ 33/324; 702/92
See application file for complete search history.

(56) References Cited

U.S. PATENT DOCUMENTS

| 4,033,045 A | * | 7/1977 | Wing ........................... 33/275 G |
| 4,123,849 A | * | 11/1978 | Maughmer ..................... 33/320 |
| 4,260,253 A | * | 4/1981 | Tuthill .......................... 356/153 |
| 4,512,086 A | * | 4/1985 | Galuschak et al. ............. 33/324 |
| 5,327,089 A | * | 7/1994 | Ouellette ...................... 324/345 |
| 2009/0089001 A1 | | 4/2009 | Lin |
| 2011/0090244 A1 | * | 4/2011 | Pantfoerder .................. 345/619 |

* cited by examiner

*Primary Examiner* — Christopher Fulton
(74) *Attorney, Agent, or Firm* — Muncy, Geissler, Olds & Lowe, P.C.

(57) ABSTRACT

The invention relates to an orientation device comprising: a true north finder including a rate-gyroscope-type member, as well as sensors that can be used to measure the inclination of the device in relation to the horizontal, and associated calculation means for determining the orientation of the true north used on information provided by the rate gyroscope-type member and the sensors. According to the invention, the device also includes three feet that are used to support the device when it is placed on a support, at least one of said feet including a built-in sensor that changes state when the device is resting on a support by means of the feet, and means for automatically triggering the determination of the orientation of the north when the device is sufficiently horizontal and when the sensor indicates that it is placed on a support.

4 Claims, No Drawings

ORIENTATION DEVICE INCLUDING MEANS FOR DETECTING THAT THE DEVICE IS LYING FLAT ON A SUPPORT

The invention relates to optimizing how north is determined using an orientation device comprising a true-north finder that includes for example a member of rate gyro type associated with calculation means.

BACKGROUND OF THE INVENTION

The invention is intended to be used notably with sighting binoculars intended to allow a soldier to identify a target notably by the bearing at which he sights this target through his binoculars.

In concrete terms, when he uses such binoculars, the solder has to fix and connect them to an orientation device, which is a true-north finder, and which provides these binoculars with information indicative of the orientation of north.

In practice, the north finder is incorporated into a tripod to which the binoculars are fixed in such a way that they are rigidly secured to the north finder. When the soldier is setting up his equipment he has first of all to erect the tripod and then mount the binoculars on it.

The assembly has to be placed on a fixed support so that it is immobile in relation to the ground, and arranged horizontally so that the true-north finder can operate correctly.

When the assembly is in place, the soldier triggers the process of identifying true north, for example by operating a corresponding control on the north finder.

In the identification process, the member of rate gyro type and the associated calculation means determine the projection of the earth's axis of rotation in a plane tangential to the surface of the earth, i.e. a horizontal plane, at the location being considered, the direction of this projection corresponding to the orientation of true north.

In more concrete terms, the member of rate gyro type measures the movements it experiences in order to determine the earth's axis of rotation, such that the process of determining north is ultimately relatively lengthy. Because the desired precision is of the order of one milliradian, the process of determining true north takes several minutes.

Once the operation. of determining north is over, the soldier can use his binoculars to determine the orientation of one or more targets with respect to north, the north information being transmitted to the binoculars and displayed therein.

In practice, the time taken to go through the various steps that have to be carried out in order for a soldier to be able to determine the bearing of one or more targets is long, notably bearing in mind the time it takes for the north finder to determine true north.

OBJECT OF THE INVENTION

The aim of the invention is to propose a solution for reducing the time needed for a soldier in possession of such equipment to be able to determine the bearing of one or more targets that have to be identified.

SUMMARY OF THE INVENTION

To this end, a subject of the invention is an orientation device comprising a true-north finder including a member of rate gyro type and sensors for measuring the inclination of this device with respect to the horizontal, and associated calculation means for determining the orientation of true north on the basis of information issued by the rate-gyro-type member and the sensors, characterized in that it comprises three legs intended to support it when placed on a support, and in that at least one of these legs incorporates a sensor that changes state when the device is resting on a support via its legs, and means for automatically triggering a determination of the orientation of north when the device is sufficiently horizontal and the sensor is indicating that it is resting on a support.

Thanks to its three legs, one of which is fitted with a sensor, the device is able to determine whether it is lying flat on a support. The sequence of determining true north can thus be triggered entirely automatically as soon as the device determines that it is resting flat on a support, this representing a considerable time saving when setting up such a device.

Another subject of the invention is a device as defined hereinabove, further comprising three other legs designed so that it can be rested upside down on a support, and in which at least one of the three other legs comprises a sensor that changes state when the device is resting upside down on a support via these three other legs, as well as means for automatically triggering a determination of the orientation of true north when the device is sufficiently horizontal and the sensor is indicating that it is resting upside down on a support.

Another subject of the invention is a device as defined hereinabove, in which the legs are arranged in such a way that it cannot be rested on a support other than by resting on three of its legs.

Another subject of the invention is a device as defined hereinabove, which further incorporates sighting binoculars.

DETAILED DESCRIPTION OF THE INVENTION

The idea behind the invention is for the process of determining true north to be triggered automatically as soon as the north finder is resting flat, i.e. as soon as it is orientated horizontally and immobile.

In the embodiment described hereafter, the orientation device or true-north finder is fully incorporated into the sighting binoculars to form a single device. The true-north finder includes a member of rate gyro type with calculation means and additional sensors.

That being so, when the soldier rests his binoculars flat, on a fixed support, the binoculars themselves identify that they are immobile, so that they activate the true-north finder in order automatically to trigger the process of determining north.

Thus, when the soldier is setting up, as soon as he lays his binoculars flat on a fixed support these binoculars completely automatically trigger the detection of the orientation of true north. When he picks them up again, for example having set up the rest of his equipment, the binoculars are directly ready to be used to determine the orientation of one or more targets.

In practice, the binoculars have three legs on their underside, these being arranged in such a way that the only possible way of resting these binoculars on a support is for them to rest on this support via their three leas. At least one of these legs is fitted with a sensor in the form of an electrical contact switch which changes state when the load experienced by the leg in question is above a predetermined threshold value, thus indicating that the binoculars have been laid down.

To complement that, the north finder incorporated into the binoculars comprises means of measuring its inclination with respect to the horizontal so as to determine whether or not this north finder is horizontal enough for the process of determining north to run correctly.

These means of assessing horizontality, i.e. inclination with respect to the horizontal, may be formed of a sensor that includes two accelerometers of MEMS type or the like, orientated at right angles in a plane that is horizontal when the binoculars are horizontal.

This horizontality or inclination sensor makes it possible to determine whether or not the north finder is sufficiently horizontal and, if it is, it provides the calculation means of the north finder with a measurement of the inclination thereof, which is taken into consideration by this north finder in measuring the rotation of the earth.

When the contact switch detects that it is experiencing a loading above a threshold value, and the horizontality detection means are indicating that the north finder of the binoculars is sufficiently horizontal, that means that the binoculars are resting horizontally. When that is the case, the process of identifying true north using the member of rate gyro type and the associated calculation means is triggered automatically.

Similarly, the binoculars may also be provided on their top surface with three other legs which are like-wise arranged in such a way that the only way of resting these binoculars on a support via their top surface is for them to rest on all three of their upper legs.

Once again, of the upper legs of the binoculars is provided with a sensor, for example in the form of an electric contact switch or some other detector which likewise changes state when it identifies that the leg equipped therewith is experiencing a load higher than a predetermined threshold value.

When that is the case, when the binoculars are placed upside down on a support, they rest on this support via their three upper legs, so that the contact switch with which one of the upper legs is fitted changes state. If the means of assessing horizontality are detecting that the north finder, i.e. the binoculars, is/are sufficiently horizontal, the process of identifying true north is triggered entirely automatically.

The sensors that measure horizontality in the north finder incorporated into the binoculars, which are typically accelerometers of MEMS type, are advantageously also used for determining whether or not the equipment is moving in relation to the ground during the process of determining north.

The triggering of the identification of north may also be conditional not only on the fact that the binoculars are resting horizontally, but also on the fact that they are not experiencing any acceleration, i.e. on the fact that they are actually immobile with respect to the ground.

When that is the case, the triggering of the process of determining north is triggered automatically only when a sensor with which a leg is equipped indicates that it is experiencing a load higher than the threshold, and the binoculars are horizontal, and the accelerometers are indicating that the binoculars are not experiencing any acceleration.

In other words, the contact switch in each leg is backed up by data from the accelerometer or accelerometers with which the binoculars are equipped, or from any other movement detection means which could potentially have a relatively low precision as far as binocular movement detection is concerned.

This avoids the process of determining north being triggered when the binoculars are resting on a support that is moving, for example when their user is traveling in a vehicle and has set his binoculars down somewhere in this vehicle: when that happens, a contact switch may be depressed, but because the accelerometers detect the movement of the vehicle, the process of detecting north is therefore not triggered.

In the above example, the true-north finder is incorporated into binoculars. However, the invention is just as applicable to an independent true-north finder. In that case, the operation is the same: the north finder has three lens on its underside and possibly three legs on its top surface, with one or more contact switches. When the north finder detects that it is horizontal and that it is resting on a support, and possibly that it is not experiencing any movement, it then automatically triggers the process of determining true north.

Finally, it should be noted that the triggering of the determining of true north may also be conditional on compliance with additional conditions. In particular, when the device is resting horizontally and is immobile, and has just identified true north, a further identification is not to be triggered when the previous one is finished.

In practice, various additional conditions are anticipated in order to bring about identification of true north. For example, if the device has been resting horizontally and motionless for a certain length of time, and north has already been identified earlier during this predetermined length of time, a further identification is not to be triggered because the information found earlier regarding the orientation of north remains valid.

The invention claimed is:

1. An orientation device comprising a true-north finder including a member of rate gyro type and sensors for measuring the inclination of this device with respect to the horizontal, and associated calculation means for determining the orientation of true north on the basis of information issued by the rate-gyro-type member and the sensors, comprising three legs intended to support it when placed on a support, and at least one of these legs incorporates a sensor that changes state when the device is resting on a support via its legs, and means for automatically triggering a determination of the orientation of north when the device is sufficiently horizontal and the sensor is indicating that it is resting on a support.

2. The device as claimed in claim 1, further comprising three other legs designed so that it can be rested upside down on a support, and in which at least one of the three other legs comprises a sensor that changes state when the device is resting upside down on a support via these three other legs, as well as means for automatically triggering a determination of the orientation of true north when the device is sufficiently horizontal and the sensor is indicating that it is resting upside down on a support.

3. The device as claimed in claim 1, in which the legs are arranged in such a way that it cannot he rested on a support other than by resting on three of its legs.

4. The device as claimed in claim 1, which further incorporates sighting binoculars.

* * * * *